Patented Dec. 14, 1937

2,101,944

UNITED STATES PATENT OFFICE.

2,101,944

CONDENSATION PRODUCT AND PROCESS OF PRODUCING SAME

Herbert Hönel, Vienna, Austria, assignor to Helmuth Reichhold, Detroit, Mich., doing business as Reichhold Chemicals No Drawing. Original application December 20, 1934, Serial No. 758,502. Divided and this application October 7, 1935, Serial No. 43,987

5 Claims. (Cl. 260—4)

The invention relates to condensation products of the phenol-aldehyde type, and to combinations of such products with substantially neutral resins, fatty oils, waxes and other ester-like bodies.

The present application is a division of my prior application Serial No. 758,502 filed December 20, 1934 now Patent No. 2,079,210. It has been shown in certain of my prior applications and patents that homogeneous products may be obtained from the interaction of certain heat hardening phenol formaldehyde condensation products and substantially neutral resins, fatty oils, waxes and other ester-like bodies. The interaction products prove to be of particular value in the varnish and lacquer field and for similar purposes. The phenol condensation products, whether they are crystalline, liquid, viscous or already in a solid resinous form, due to their relatively low molecular weight, are readily soluble in common solvents. They are obtained from a substantial excess of formaldehyde over the equimolecular proportion, and phenols having only two of the reaction favorable positions in the molecule unoccupied, with the aid of a strong alkaline catalyst which is neutralized after the chemical combination has taken place. The phenols may be monovalent or polyvalent, mononuclear or polynuclear, the reaction favorable positions being ortho- and para-positions to the phenolic hydroxy group or groups, respectively.

It has further been shown that such condensation products as derive from phenols carrying at least one higher aliphatic or hydroaromatic, or generally speaking, one higher saturated hydrocarbon radical, are well compatible with drying oils. These phenols may also be applied in mixture with other phenols not carrying such a radical, the total number of the unoccupied reaction favorable positions also being two.

Now I have found that as a rule the number of such saturated carbon atoms of the substituting group or groups, respectively, preferably should not be lower than three per each phenolic hydroxy group of the phenol used, in order to secure sufficient oil compatibility of the hardening condensation product. In this case even the maximum proportion, that is to say two mols of formaldehyde per one mol. of the phenol, may be chemically combined, yielding a condensation product of particularly high hardening effect when reacted with neutral resins, fatty oils, etc., as described in my specifications above mentioned.

This, however, does not mean that phenols carrying a lower alkyl are entirely inoperative for my process. So for instance, para-ethyl-phenol, when condensed with an excess of formaldehyde, yields a hardening condensation product which is fairly compatible with China wood oil, but only when condensed without excess or with a relatively small excess of formaldehyde the condensation product obtained is easily compatible with other drying oils. The condensation product, however, in this case does not show the maximum of hardening capacity which otherwise is attainable.

From para-cresol, no condensation product can be prepared having distinct hardening properties and yet being compatible with any drying oil at the same time. However, it yields fairly oil compatible condensation products of the non-hardening type which are obtained from the condensation with only the equimolecular proportion of formaldehyde or less.

The general rule regarding the number of aliphatic carbon atoms which should be present to secure good solubility in oils also applies to phenols carrying mixed aliphatic-aromatic hydrocarbon radicals, such as aralkyls. For illustration I mention that para-cumyl phenol (4-hydroxy diphenyl-dimethyl-methane) behaves similarly to para-isopropyl-phenol, in that it yields, even when condensed with a maximum proportion of formaldehyde, hardening products which are fairly compatible with drying oils of any kind, including bodied oils. The para-benzyl-phenol yields only hardening condensation products of limited compatibility with drying oils, and behaves in a manner similar to para-ethyl-phenol. From para-phenyl-phenol (4-hydroxy diphenyl) only oil compatible condensation products may be formed which have no hardening character or only to a slight degree. This phenol behaves in a similar manner to para-cresol and is slightly superior as regards the oil compatibility of the condensation products obtained therefrom.

In all these cases, the corresponding ortho compounds behave similarly to the para compounds, but it should be pointed out that condensation products from ortho-cresol show far poorer oil solubility than those from para-cresol, provided conditions are equal.

Further investigations have proved that methyl groups in meta positions which are present in addition to hydrocarbon groups in one of the reaction favorable positions, in certain cases do not increase the compatibility of the hardening condensation products with drying oils. So 1,2,4- xylenol is not superior to para-cresol. Benzyl-meta-cresols, which are obtained from meta-cresol and benzyl-chloride, yield a hardening condensation product which shows even less oil compatibility than a corresponding one from para- or ortho-benzyl phenol. Also the benzyl compounds which are obtained from 1,3,5 symmetric xylenol and benzyl-chloride do not yield condensation products of superior oil compatibility when condensed with an excess of formaldehyde, as compared with corresponding condensation products from benzyl phenols. These behaviours are probably due to the fact that methyl groups in meta-position influence the activity of the hydrogen atoms in the reaction favorable positions of phenols. A superior activity is also shown up by meta-cresol in comparison to phenol itself; the meta-cresol therefore condenses with aldehydes, as is known, considerably faster than phenol. This, however, does not apply to the presence of higher hydrocarbon groups in meta-positions, since, as has been shown by my prior patents, good results are obtained also from phenols carrying a higher hydrocarbon radical in a non-reaction favorable position, that is to say, in a meta-position to the phenolic hydroxy groups, as long as the general rule holds true that only two reaction favorable positions are unoccupied. So for instance, condensation products from carvacrol which carries the isopropyl group in meta-position and the methyl-group in ortho-position show equal compatibility with oils as condensation products from corresponding amounts of formaldehyde and the isomeric-thymol which carries the isopropyl group in one of the reaction favorable ortho-positions while the methyl group is in one of the meta-positions.

Another example of a phenol which carries the substituent, securing oil compatibility in one of the meta-positions, and which yields condensation products well adaptable for my process, is para-chloro-m-tertiary-butyl-phenol. Also two ethyl groups in the meta-positions may secure oil compatibility of the hardening condensation product, or even one ethyl group in meta-position in addition to a methyl group in one of the reaction favorable positions. Good results are obtained, e. g. from 3,4-diethyl phenol, 3,5-diethyl-4-chloro-phenol or 4-methyl-3-ethyl phenol.

Hardening condensation products which are derived from phenols carrying substituents in meta-position behave to exceptional advantage, inasmuch as they finally lead to condensates of particularly high alkali resistance. This is also shown by the interaction products which are obtained from these condensation products with drying oils.

I have found further that, as a rule, also in the case of polyvalent phenols, three aliphatic or hydroaromatic carbon atoms should be present for each phenolic hydroxy group to secure good compatibility with oils. According to the general rule, however, only two of the reaction favorable positions must be unoccupied at the same time. By the presence of a second phenolic hydroxy group in the benzene ring, the chemical behaviour is appreciably changed and not entirely comparable with those in the mono-hydroxy-benzene. It is, however, easily understood that in the catechol the two ortho- and two para-positions to the phenolic groups are to be considered as reaction favorable positions. The same applies to the hydro-quinone, which has four ortho-positions to the hydroxy groups. The formulae below indicate the reaction favorable positions:

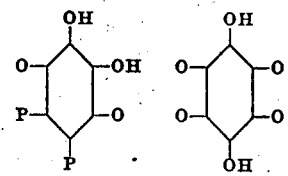

It can be seen from this that two of these reaction favorable positions must be occupied by substituents in order to comply with the general rule. For instance, tertiary-butyl groups are easily introduced according to known methods. The resulting products usually are viscous bodies with very little tendency to crystallize because a complicated mixture of isomers is present.

The dibutyl-catechol and di-butyl-hydro-quinone lead to condensation products of high hardening capacity and good oil compatibility. Also, when introducing one cyclo-hexyl or tertiary octyl group and one chlorine in these dihydroxy-benzenes, suitable phenols are obtained. The total number of aliphatic or hydro-aromatic carbon atoms divided by the number of the phenolic groups is also 3, or exceeds 3, in these cases.

The presence of a second phenolic group in meta-position, as is the case in the resorcin, changes the fundamental behaviour considerably. Positions 2, 4 and 6 in the formula below are indicated by two points:

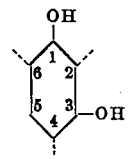

It seems that these positions may be considered as reaction favorable positions of double activity. It is, for instance, a matter of fact that resorcin reacts unusually fast with formaldehyde. On the other hand, the position 5 should not be a reaction favorable one, since it is in meta-position to both phenolic hydroxy groups. Now it has also been found that resorcin must carry two substituents in order to comply with the general condition. Then it behaves like its double substituted isomers, mentioned above, or like suitably substituted monovalent phenols. In other words, in the resorcin the meta-position 5 functions as a reaction favorable position. Suitable derivatives may be obtained in a corresponding way as from its isomers.

It has also been shown by my prior applications that polynuclear-polyvalent-phenols are operative in my process, such as suitable derivatives of the dihydroxy-diphenyl-methane. Two of its four reaction favorable ortho-positions to the phenolic groups must be occupied. In order to secure sufficient oil-solubility of hardening condensation products prepared from such phenols and an excess of formaldehyde over the equimolecular quantity, the average number of saturated carbon atoms figured for each phenolic group should be 3 or more, according to the rule stated above.

The number of aliphatic or hydroaromatic carbon atoms required may be represented by groups substituted in the ortho-positions or also by groups replacing the hydrogen atoms of the methylene group. Suitable derivatives of this type are obtained in a known manner from the cheap ortho-cresol and a higher carbonyl compound, such as butyl-aldehyde or methyl-ethylketone, or still higher homologues with the aid of an acid catalyst. The phenolic bodies obtained lead to hardening condensation products when operating in the described way, which show good or at least fair compatibility with oil. The ketones mentioned before are now easily available in comparatively cheap materials.

It has been shown by my prior applications that suitable polynuclear phenols are also obtained from ortho-cresol and hydro-aromatic-carbonyl compounds, such as cyclo-hexanone or the technical mixture of the methyl-cyclo-hexanones. These phenols contain a closed chain radical.

The ortho-cresol may be replaced wholly or in part by the paracresol, which, however, is not as cheap as ortho-cresol.

The ortho- or para-cresol may also be replaced by their higher homologues, such as the corresponding ethyl phenol. The number of carbon atoms of the aliphatic carbonyl compounds may be reduced in these cases, or even aromatic carbonyl compounds may be used. In all these cases described in the foregoing paragraphs, the resulting crude reaction products suit my process. Crystalline bodies are seldom obtained, especially since the ketones employed are technical mixtures of isomers.

I have previously pointed out in my aforesaid specifications that, in addition to such phenols which, due to the high molecular saturated substituents, yield a readily oil soluble hardening condensation product, phenols may also be employed which, when condensed by themselves, do not yield hardening condensation products of sufficient compatibility with drying oils. The phenols, however, must comply with the general rule, that is to say, they must have only two reaction favorable positions left unoccupied. Now I have also found to be a rule in this case, that when a mixture of phenols is condensed, the total number of saturated carbon atoms divided by the number of the phenolic groups should preferably be 3 or more, in order to secure sufficient compatibility of the hardening condensation products with drying oils. So for instance, equimolecular proportions of para-ethyl and para-butyl phenol, and para-cresol and para-amyl phenol, yield condensation products which are sufficiently compatible with any drying oil even when possessing the maximum hardening effect. The same applies, for instance, to an equimolecular mixture of para-cyclohexyl phenol and para-chloro phenol. A non-phenolic benzene ring as substituent may be counted as equivalent of 1 to 2 aliphatic saturated carbon atoms. So for instance, the mixture of 2 mols para-phenyl-phenol and 1 mol. para-hexyl phenol leads to about equal results as the mixture mentioned above. Other examples of mixtures of 2 or more phenols are:

2 mols p-amyl-phenol and
    1 mol. p-benzyl-phenol
or 1 mol. p-hexyl-phenol and
    3 mols p-benzyl-phenol
or 1 mol. dibutyl catechol and
    1 mol. 1,2,4, xylenol
or 1 mol. octyl-phenol and
    1 mol. p-cresol and
    1 mol. p-chloro-m-cresol
or about 1 mol. di-(4,4) hydroxy-di-(3,3) butyl-diphenyl-butan and
    2 mols p-chloro-phenol and/or
    2 mols p-cresol.

In the foregoing examples the para compounds may be replaced by the corresponding ortho compounds. Instead of condensing the mixture of phenols with formaldehyde, separately prepared formaldehyde condensation products of the single phenols may be mixed or heated together after mixing if higher stages of condensation are desired, as described in my earlier specifications. As set forth in my older specifications mentioned hereinbefore and in my Patents Nos. 1,800,295 and 1,800,296, the condensation of the phenols or mixtures of them is effected according to the method of Lederer and Manasse, preferably by leaving the phenols, aqueous formaldehyde and a strong alkaline catalyst in contact for a prolonged period of time. The process includes the careful neutralization or slight acidification of the reaction mixture, which action should only be done after the phenol and the formaldehyde are combined. These two components should form a uniform solution with the aid of a catalyst. In some cases inert solvents, such as alcohols or mixtures of alcohol and benzene, etc., should be added to secure a uniform solution and continual contact of the reacting components. The aqueous formaldehyde in these cases should be replaced by its anhydrous forms wholly or in part. Such a procedure preferably applies to phenols which, on account of substituents in meta-positions, tend to condensation products having low solubility in caustic solutions.

It has been proved that as a rule all phenols having two reaction favorable positions in the molecule are capable of combining up to such amounts of formaldehyde which correspond to 2 mols. In this case, the condensation product obtained shows maximum hardening effect, as said before. When carrying out the condensation at low temperatures from maximal proportions of formaldehyde the corresponding phenol di-alcohol is obtained. However, in order to accelerate this reaction still larger amounts of formaldehyde may be used, but finally not more than 2 mols of formaldehyde are chemically combined by the phenol. If dialcohols are desired, an excess of formaldehyde is advisable, since in the presence of a strong alkali a part of the latter is decomposed by the Canizzaro reaction. The uncombined formaldehyde may be regained in a suitable way.

The final condensation products are crystalline, liquid, or are more or less viscous when ordinary or slightly elevated temperatures have been applied during the condensation. They are of solid resinous form when elevated temperatures have been applied for a prolonged time. The preferred way to form such solid resinous products, however, consists in forming first an especially low molecular liquid condensation product and in subjecting this product after neutralization to a temperature preferably higher than 100° C.

A few examples may illustrate my process. However, my process is not to be restricted to these examples, as they are only to be considered as illustrations. The aqueous formaldehyde referred to is the commercial 40% solution by volume. The temperatures are in degrees centigrade.

*Example 1*

61 gm. para-ethyl-phenol and 53 gm of aqueous formaldehyde are condensed by leaving them in contact in the presence of caustic liquid corresponding to about 5 gm. NaOH. After a few days the two components are combined and after neutralization form a low viscous condensation product.

When this product is heated with approximately twice as much China wood oil to temperatures of about 150° C. or higher, a uniform mass is gradually formed with the evolution of steam. If the reaction mixture is cooled, while still reacting, shortly after it shows homogeneity in the hot state, most of the phenolic condensation products precipitates out from its solution, but after the reaction has been completed, which suitably should be done between 200°–230° C., a permanently homogeneous clear interaction product is obtained. Its external appearance is that of a highly viscous oil which is soluble in all ordinary varnish solvents, including petroleum distillates in which the phenolic condensation product itself is entirely insoluble.

The condensation product as obtained above may also be heated alone first to temperatures of about 150° C. until a solid resinous condensation product is obtained. This forms homogeneous reaction products with China wood oil, in a way quite similar to the still liquid condensation product. When heated the condensation product (one part) with rosin-glycerine-ester (four parts) to about 240° C., a homogeneous product is obtained, the melting point of which is about 25° to 30° C. higher than that of the rosin-ester. This means that the condensation product does not possess the highest obtainable hardening effect. Both the liquid and the solid condensation product, when heated with linseed oil or the like, only enter into solution at about 180°–190° C. At this temperature, however, the condensation product is converted into the infusible stage so that in some cases only an incomplete combination of the condensation product with linseed oil takes place. In order to obtain condensation products which are compatible with bodied linseed oil, the rate of chemically combined formaldehyde must be reduced still more.

Example 2

100 parts of a mixture of ortho- and para-isopropyl-phenol, 120 parts of aqueous formaldehyde, 12 parts of caustic soda solution (40%) are left in contact at room temperature until chemical combination has taken place, which requires about two weeks. The amount of formaldehyde corresponds to 2 mols per 1 mol. of the phenol. After neutralization, a liquid condensation product is obtained which may be converted by further condensation under action of heat into a solid resinous condensation product. Both the dried liquid and the solid product dissolve in a multiple quantity of China wood oil at about 100° C., forming a solution that separates on cooling. When heated above 150° C. considerable reaction sets in, and when heating is continued for a sufficient time, a uniform, permanently clear reaction product is obtained. If the reaction is carried to completion such as is suitably done within about ½ hour at temperatures of about 220° C., a highly viscous product is obtained. The increase of viscosity, due to the condensation reaction, is so great that at least two parts of China wood oil to one part of the condensation product should be used to avoid gelatinization.

The phenolic condensation products also dissolve in linseed oil and similar oils at temperatures of about 150° C., and separate out on cooling. By prolonged heating above 150° C., or in far shorter time above 200° C., a permanently clear interaction product is obtained.

In bodied oils the condensation products dissolve only at about 160° C. at the same time combining with the oil and forming homogeneous reaction products. The increase of viscosity, due to the reaction, is so enormous that 6 to 10 parts and even more, of the bodied oil have to be taken to avoid gelatinization, the minimum proportion depending on the original viscosity of the oil.

By heating the condensation product (one part) with four parts of rosin-ester in the way described above, a resin is obtained, the melting point of which is about 55°–60° C. higher than that of the rosin-ester.

Example 3

Very similar condensation products are obtained by condensing a mixture of 4 parts para-ethyl-phenol and 5 parts para-tertiary-butyl-phenol with 11 parts of aqueous formaldehyde or more, or by condensing a mixture of 2 parts para-cresol and 3 parts para-tertiary-amyl-phenol with 6 parts formaldehyde or more in a way such as described in the foregoing examples. The proportions given correspond to about equimolecular quantities of the phenols in the mixture used and to a double molecular quantity of formaldehyde respectively, and might be varied slightly. The solubility conditions and hardening effect of the condensation products are very much like those of the condensation products obtained in Example 2, the varnishes showing excellent color retention, which is due to the exclusive use of para-substituted phenols.

Instead of forming the condensation product from mixtures of phenols, also the corresponding condensation products separately formed, for instance dialcohols, may be mixed after having been neutralized. The mixture of dialcohols, etc. may be heated above 100° C. if a solid condensation product is desired.

Example 4

50 parts chemically pure para-benzyl-phenol of a melting point of 84, 30 parts commercial formaldehyde solution, 4 parts of NaOH, or equivalent amounts of KOH, etc., are left in contact for about 3 days, after which time chemical combination has taken place. By neutralization or slight acidification, a liquid condensation product is obtained which may be converted into solid resinous stages through further condensation.

A solid resinous condensation product is also obtained by heating the reaction mixture before neutralization, for several hours at about 70° C., preferably after the benzyl-phenol and formaldehyde have combined. The condensation product of the higher stage partly separates out already before the neutralization due to the decrease of alkali solubility. When neutralizing at a temperature considerably above the melting point, a viscous mass is obtained which after cooling is a brittle resin and may be dried in any suitable manner.

The condensation products obtained according to the methods described, show properties very similar to that of the condensation products obtained according to Example 1. It is, however, also possible to react them with linseed oil or similar drying oils at temperatures above 160° C., whereby homogeneous reaction products are obtained. The condensation products do not show the maximum hardening effect due to the relatively small excess of formaldehyde.

Example 5

Equal parts by weight of para-cumyl-phenol (4-hydroxy - diphenyl - dimethyl - methane) and aqueous formaldehyde, and sufficient amounts of caustic alkali to form a clear solution, are treated in a manner corresponding to any of the preceding examples. The formaldehyde employed corresponds to a considerable excess over 2 mols per 1 mol. of the phenol, said 2 mols being the maximum quantity with which the phenol used is capable of combining. After about one week's standing at room temperature, or slightly elevated temperature, this maximum quantity has chemically combined. The condensation product finally obtained, which is liquid or solid, depending on the temperature used, shows very similar properties and behaviour with regard to solubility in the different types of drying oils and the high degree of hardening effect as the condensation products obtained in Example 2 or 3.

Example 6

55 gm. catechol are dissolved in about 30 gm. tertiary butyl-chloride and 2 gm. aluminum chloride or zinc chloride or the like are added. The reaction soon sets in at room temperatures with the formation of hydrochloric acid. Furthermore 72 gm. of butyl-chloride are added gradually. The temperature is finally raised to 50° and kept for several hours. About $\frac{1}{10}$ of the butyl-chloride used does not take part in the substituting reaction, but is decomposed into hydrochloric acid and butylene. The soft brown reaction product is thoroughly washed. It is to be regarded as a mixture of isomeric 1,2-dihydroxy (iso) dibutyl-benzenes. It forms with 100 gm. of aqueous formaldehyde and about 5 gm. of sodium hydroxide a clear solution. The formaldehyde employed exceeds the quantity which can be taken up by the phenolic body. By acidifying, a soft resinous condensation product is obtained which, if desired, may be converted into a solid resin.

Both condensation products are readily soluble in drying oils in the cold even before entering into reaction. By the application of heat the typical hardening effects are obtained. Due to their good solubility in drying oils, the condensation products may also be used as bases for baking varnishes, the hardening reaction being effected after application of the varnish. In this case preferably smaller proportions of the drying oil, especially heavy bodied oils, should be employed. Particularly hard and resistant coats are obtained in this way, as described in my prior specifications.

Example 7

The total quantity of phenolic body obtained when proceeding according to Example 6, and 85 gm. ortho-phenyl-phenol are left in contact with 160 gm. of aqueous formaldehyde with the aid of a strong alkali for about 20 days. A viscous condensation product is obtained after neutralization which, if desired, may be converted into a solid resin. The condensation products which show all typical hardening properties are readily soluble in warm drying oils and form permanently clear reaction products when heated to reaction temperatures.

Example 8

150 gm. 1,2 di-ethyl 4 hydroxy benzene, 160 gm. of aqueous formaldehyde and about 10 gm. NaOH form a clear solution. After several days the solution becomes turbid due to decrease of alkali solubility of the condensation product. By adding alcohol or in addition some benzene, the uniformity of the reaction mixture is regained. After three weeks' standing, the formaldehyde has combined. Through acidifying, a condensation product is obtained, which after elimination of the water and the solvents used, is a solid resinous mass.

It dissolves readily in warm drying oils, already at temperatures considerably below the reaction temperatures. Through reaction, permanently clear products are obtained of particularly high value. The alkali resistance of coatings resulting from these interaction products is still superior to those deriving from phenols having no meta substituents.

Example 9

The tertiary-butyl group is substituted according to known methods in the symmetric 1,3,5 xylenol of a melting point of 64°. Three parts of the substituted product and 1 part of anhydrous para-formaldehyde, about 2 parts of alcohol in 1 part of benzene or its homologues, and $\frac{1}{2}$ part of concentrated aqueous alkali solution form, after prolonged shaking, a nearly homogeneous reaction mixture. It is kept at temperatures between 40° and 60° for 2 days. If the reaction mixture becomes considerably unhomogeneous, more of the solvents mentioned should be added. The reaction mixture is slightly acidified and the aqueous layer separated from the solvents which contain the condensation product. This solution may be used directly for combining the condensation product with drying oils, etc., or the solvent may be evaporated first. In this way a solid resinous condensation product is obtained which is readily soluble in drying oils and is capable of bringing about an intense hardening effect.

Also, interaction products from this condensation product with drying oils and stuffs containing the same, ester gums, etc., show a particularly high alkali resistance, similar to the results brought about with the condensation products obtained according to Example 8. Also when substituting in the xylenol mentioned propyl- or amyl- or still higher groups, useful results are obtained.

Example 10

Gaseous hydrochloric acid is passed into a solution of 2 parts of ortho-cresol and 1 part of methyl-propyl-ketone, containing varying quantities of diethyl-ketone, until the solution is saturated. The reaction mixture is warmed for several days to 35°–40° C. The resulting brown viscous mass is washed with water and then liberated in a suitable way from the ortho-cresol used in excess, such as by vacuum distillation, water steam distillation, or washing with diluted alkalis.

About 2 parts aqueous formaldehyde and $\frac{1}{2}$ part of soda-lye (40%) form a clear reaction mixture with the intermediary product obtained above. The mixture is kept for several days at 40° C. By neutralizing a condensation product is obtained which is viscous at 90° and solid at room temperature.

It dissolves in slightly warmed drying oils and on reacting with oils some of its intense brownred color disappears. The reaction products are permanently clear and show excellent properties. Also a fair light-proofness can be noticed when intermediate products are used which are carefully liberated from the ortho-cresol, while ortho-cresol itself tends to exhibit very annoying yellowing phenomena.

Hardening formaldehyde condensation products having still better oil solubility are obtained when substituting the ketone by still higher homologues, such as methyl-butyl-ketone or ethyl-propyl-ketone, or by cyclic ketones, such as cyclohexanone or methyl-cyclohexanones. But also the employment of the lower molecular methyl-ethyl-ketone finally leads to hardening condensation products having a fair compatibility with oils.

The condensation products in the preceding examples may also be caused to react with other basic materials used in the varnish and lacquer field, particularly such as contain drying oils in physical mixture or chemical combination. In this connection I wish to mention those mixtures obtained from natural or modified or artificial resins with drying oils or mixed esters which are obtained from polyhydric alcohols with both polybasic and monobasic carboxylic acids, including those derived from drying oils.

What I claim is:

1. A process of producing solid heat hardening soluble resinous condensation products which comprises condensing by the aid of an alkaline catalyst, an excess of formaldehyde over the equimolecular proportion with a phenol in which two of the particularly reactive positions are unoccupied and which carries at least one ethyl group as substituent per each phenolic hydroxyl group present in the molecule.

2. A solid heat hardening soluble resinous condensation product capable of reacting with substantially neutral resins, drying oils and other fatty glycerides, waxes and esters derived from the interaction of polybasic acids and polybasic alcohols, said condensation product being obtained by condensing with the aid of an alkaline catalyst, an excess of formaldehyde over the equimolecular proportion with a phenol in which two of the particularly reactive positions are unoccupied, and which carries at least one ethyl group as substituent per each phenolic hydroxyl group present in the molecule.

3. A clear homogeneous mass comprising the reaction product of a drying oil with a condensation product as set forth in claim 2.

4. A solid heat hardening soluble resinous condensation product obtained by condensing para-ethyl phenol with formaldehyde in excess of the equimolecular proportion, by the aid of an alkaline catalyst.

5. A clear homogeneous mass comprising the reaction product of China wood oil with the heat hardening condensation product set forth in claim 4.

HERBERT HÖNEL.